United States Patent [19]

MacDonald

[11] Patent Number: 4,776,191

[45] Date of Patent: Oct. 11, 1988

[54] KEY HOLDER

[76] Inventor: Sumner MacDonald, P.O. Box 2552, Providence, R.I. 02906

[21] Appl. No.: 42,235

[22] Filed: Apr. 24, 1987

[51] Int. Cl.⁴ .............................................. A47G 29/10
[52] U.S. Cl. ........................................ 70/459; D3/61
[58] Field of Search .............. 70/459, 456 R; 24/239, 24/231, 3 K; D3/61, 62

[56] References Cited

U.S. PATENT DOCUMENTS

| D. 271,443 | 11/1983 | MacDonald | D3/61 |
| D. 285,987 | 10/1986 | MacDonald | D3/61 |
| 362,768 | 5/1887 | Mead | 24/239 |
| 576,339 | 2/1897 | Clayton | 24/239 |
| 649,460 | 5/1900 | Jordan | 24/239 |
| 1,302,067 | 4/1919 | Mendelsohn | 24/3 K |
| 1,581,875 | 4/1926 | Salvog | 70/459 |
| 2,527,457 | 10/1950 | Schupbach | 70/459 |
| 2,531,325 | 11/1950 | De Cesaris | 70/459 |
| 4,584,858 | 4/1986 | Wolter | 70/459 X |
| 4,592,219 | 6/1986 | Richter | 70/459 X |
| 4,644,611 | 2/1987 | Tanaka | 24/239 X |

FOREIGN PATENT DOCUMENTS

| 454235 | 4/1913 | France | 24/239 |
| 254615 | 12/1948 | Switzerland | 24/239 |
| 774212 | 5/1957 | United Kingdom | 24/239 |

Primary Examiner—Lloyd A. Gall
Attorney, Agent, or Firm—Robert J. Doherty

[57] ABSTRACT

A key holder having one end provided with an end opening such that a key ring may be easily removed therefrom. The end opening is formed by a passage which connects to a key ring retaining opening, and the passage is normally closed by a spring biased plunger which is operable to open the passage.

7 Claims, 2 Drawing Sheets

KEY HOLDER

BACKGROUND AND OBJECTS OF THE INVENTION

This invention relates to a device for holding objects such as keys either directly or more often while supported on a key ring. Such devices are normally termed "key holders" and are currently popular since they provide a manner in which a number of keys may be neatly organized and even positioned according to function. For instance, it is desirable to be able to place a single use function key, such as an automobile ignition key, in one position such that it may be readily removed when it is desired to leave the car with a parking lot or parking garage attendant while keeping the remaining keys and the holder on one's person.

Thus, it is known to provide devices that provide for the connection of keys or key rings and other objects at opposite ends of the device and to differentiate them such that the object at one end thereof may be more easily removed than the structure positioned at the other end thereof. Examples of such constructions are shown in the following U. S. patents: U.S. Pat. No. 3,345,713 to Gaupp issued Oct. 10, 1967; U.S. Pat. No. 3,350,753 to Hester issued Nov. 7, 1967; U.S. Pat. No. 3,906,763 to Bochory issued Sept. 23, 1975; and U.S. Pat. No. 4,041,579 to Chappel issued Aug. 16, 1977. Also of interest in this regard are U.S. Des. Pat. Nos. 271,443 issued Nov. 22, 1983 and 285,987 issued Oct. 7, 1986 both to the present applicant.

While such patents show constructions in which a key ring or other object positioned at one end of the device may be more easily removed than the other, they do not accomplish a further desirable objective of such key holders—that of enabling the removal of the preferred key either while such preferred key is in an active use position (e.g., while in an auto ignition) or easily accomplished using only one hand or both such actions simultaneously.

Other key holder constructions which may be to some extent operable with one hand of the user are known. These include those shown in the following U.S. patents: U.S. Pat. No. 4,129,021 to Brentini issued Dec. 12, 1978; U.S. Pat. No. 4,391,113 to Jorgens issued July 5, 1983; U.S. Pat. No. 4,407,148 to Rousseau issued Oct. 4, 1983; U.S. Pat. No. 4,429,557 to Morrone III issued Feb. 7, 1984; and U.S. Pat. No. 4,523,443 to Momemers issued June 18, 1985. Although operable by one hand, such devices still do not accomplish such action smoothly and easily or when the preferred key at one end of the holder is engaged as above indicated in an automobile ignition or the like.

It is thus an object of the present invention to provide a key holder device of the type in which a selected key may be easily removed therefrom while maintaining the remaining keys thereon. Another object of the present invention is to provide a key holder device from which a selected key may be easily separated by one hand of the user.

Still another object of the present invention is to be able to accomplish such easy separation of a preferred key while such key is actively employed in a use position such as in an automobile ignition and to be able to do such with one hand of the user.

These and other objects of the present invention are accomplished by a holder for keys and the like comprising a housing having front and rear ends, an opening proximal to said front end extending through said housing and adapted for the positioning of a key ring therethrough, a passage opening at said front end and extending between said front end and said opening such that said key ring is both received and removed from said opening through said passage, a member supported by said housing and movable between a first closed position wherein said passage is obstructed to block the removal or receipt of said key ring therein and a second open position wherein said passage is substantially unobstructed to freely permit the removal or receipt of said key ring therein.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
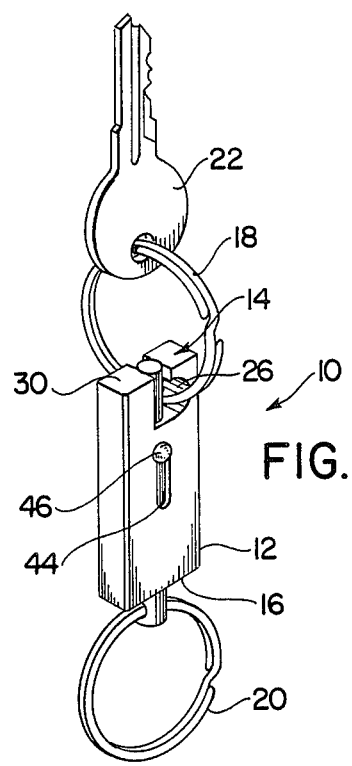
FIG. 1 is a perspective view of the key holder device of the present invention.

Turning now to the drawings, the overall configuration of the key holder 10 of the present invention is best shown by FIG. 1 wherein such includes a body or housing 12 having front and rear ends 14 and 16 respectively and to which a first key ring 18 and a second key ring 20 are attached. The rings 18 and 20 are provided at opposite ends of the housing 12 such that a primary key 22 may be attached to ring 18 and more easily removed therefrom while the remaining keys (not shown) may be attached to ring 20 for retention by the user when the primary key 22 is separated therefrom. The situation most often contemplated for such use is surrendering the primary key to a parking lot attendant as by retaining such in the automobile ignition, although certainly such situation is by example only and not meant to limit the use of the invention to such situation. The rings 18 and 20 are of conventional split type whereby new keys may be placed or removed therefrom, although the rings could be of the type which is provided with a clamp lock or, indeed, it is possible that the rings themselves could be eliminated as when the opening in a key head or other member being suspended is large enough to be positioned in the housing opening 26 as will hereinafter be more fully explained.

The housing 12 may be of any suitable construction, that is, it may take the form of the essentially solid block construction depicted or may be formed from assembled plates then assembled by suitable techniques such as welding or gluing. The housing 12 depicted includes a generally solid body 24 of generally rectangular configuration and having a front or top end 14 and a body or rear end 16. An essential feature of the device is an opening 26 which extends transversely entirely through the body 24 such that it is open on opposite sides thereof. The essential feature here is that the opening 26 pass through the body 24 such that a key ring 18 may be held thereby. Should the shape of the body be different than shown, the opening could extend other than between opposite sides or faces, e.g., if triangular, then the opening would open on adjacent sides. It is in this opening 26 which is generally circular in configuration that the ring 18 is adapted to be received. In order that the ring may enter the opening 26 or be removed therefrom, a passage 28 is provided which extends forwardly from the opening 26 and opens at the essentially flat terminal face 30 of the first or forward end 14.

Figure 4:
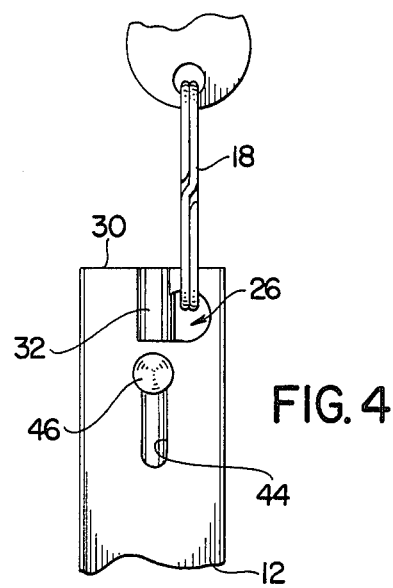
FIG. 4 is a partial view of FIG. 1 in a closed position.
Figure 4A:
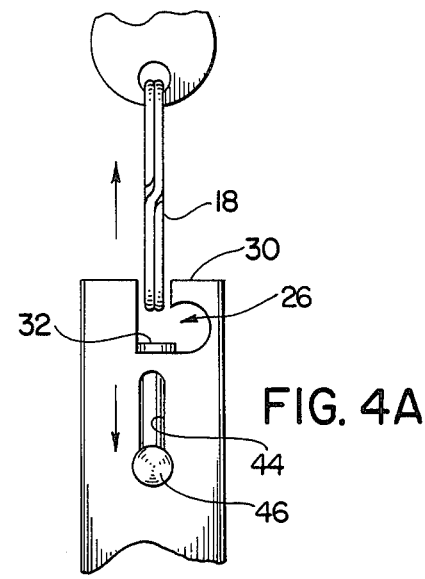
FIG. 4A is a partial view of FIG. 1 in an open position.

A member 32 which preferably takes the shape of a longitudinally extending cylindrical post is positioned within the body 12 such that it is normally biased forwardly so as to close the passage 28 to the ingress or egress of the key ring 18. Thus in FIGS. 1 and 2, the member 32 is in its first or forward position wherein the key ring 18 is locked within the opening 26; and as shown in FIGS. 4A and 5A, the member has been retracted to a rear or open position wherein the key ring 18 may be easily separated from the body 12 by relative longitudinal motion of either the key ring 18 or the body 12. Such action would take place when the primary key 22 is engaged in the user's vehicle ignition, and the user simply moves the member 32 to its open position and simultaneously withdraws the body of the key ring away from the key ring 18 to separate the two components. Of course, any relative longitudinal movement of the key ring 18 and the body 12 accomplishes this purpose and can easily be done with only one hand since the passage 28 is in the forward or front end of the body such that no obstruction is presented to the open passage 28 once the member or post 32 is in its retracted open position.

Figure 3:
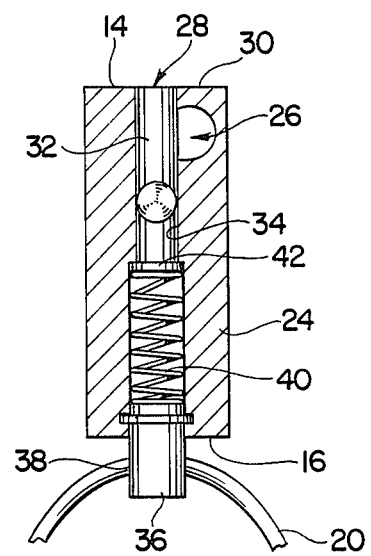
FIG. 3 is a partial sectional view of FIG. 1.

As illustrated, the post 32 is positioned within a bore 34 provided through the body 12. As best shown in FIG. 3, the bore 34 is essentially closed at one end by a swivel 36 which is press fit thereinto. Such swivel includes an opening 38 through which the key ring 20 may extend. When it is desired to remove the key ring 20 from the swivel 36, the key ring simply can be split and removed therefrom in the conventional manner.

Figure 2:
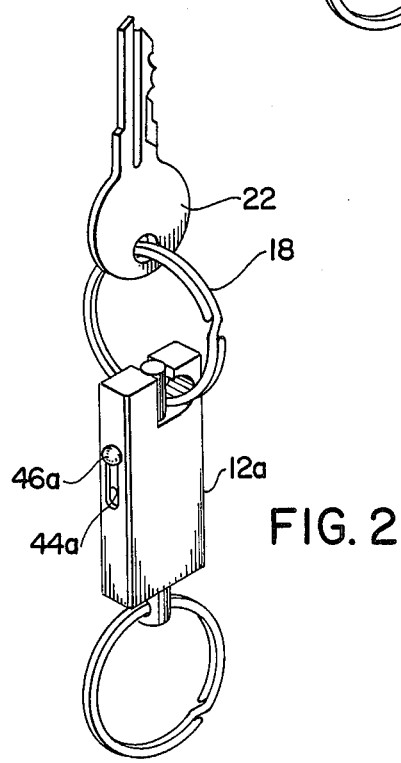
FIG. 2 is a perspective view of a modified form of the device shown in FIG. 1.

Also positioned within the bore 34 is a spring 40 which acts against the bottom of the post 32 such that the spring biases the post forwardly into the first or closed position as shown in FIGS. 1 and 2. The post may include a bottom flange 42 against which the spring acts and of a diameter to retain the post from passing upwardly out of the passage 34. The passage may be of a slightly greater diameter in its lower end for such purpose. The body 12 is further provided with a slot 44 which longitudinally extends forwardly to a point close to but separated from the opening 26. An outwardly extending pin 45 (not shown) terminating in a button 46 or other actuation means is connected to the post 32 as by force fit or other conventional means including screw connection such that the user may take his or her thumb and conveniently retract the post to the open position as shown in FIGS. 4A and 5A by a movement of the button 46 downwardly or longitudinally towards the rear end 16 of the body 12. Such action compresses the spring and enables the forward end of the post 32 to clear the passageway 28 and the opening 26 whereby the key ring 18 may be freely moved through the passageway.

It should be noted that the access to the post 32 may be provided on the side instead of the face of the body 12a as shown in FIG. 1. In such case as shown in FIG. 2, the slot 44a is similarly positioned on the side as is the button 46a. The important feature is that the mechanism by which the post is retracted is conveniently manipulable by the user preferably by his or her thumb while the body of the holder is held in the hand. Thus, this actuation action coupled with the forward or top entry and removal of the key ring enables the key ring of the preferred key 22 to be easily removed by one-handed manipulation to accomplish the overall objects of the present invention.

Figure 5:
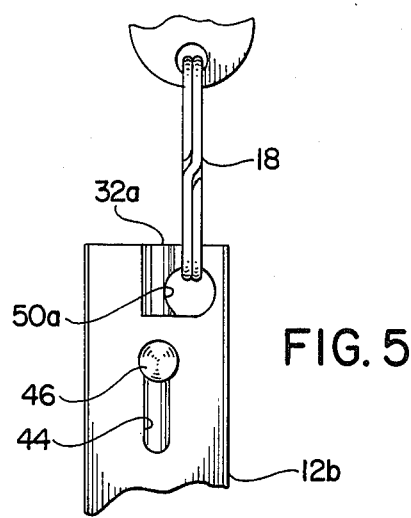
FIG. 5 is a partial view similar to FIG. 4 but showing a modified form of the device in a closed position.
Figure 5A:
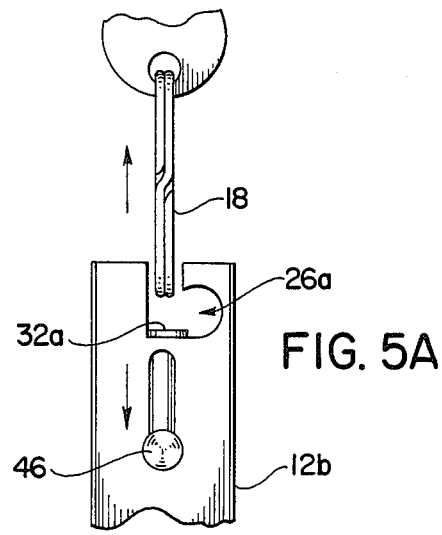
FIG. 5A is a view similar to FIG. 5 but in an open position.

Turning now to FIGS. 5 and 5A, a modified construction of the pin 32a and the opening 26a is shown. Therein, the pin includes an arcuate cut-out portion 50a which in the forward or closed position of the pin 32 is aligned with the opening 26a to form an extension thereof and thus enable a round opening 26a to be provided in a narrower width body 12b. The action for removal of a key ring 18a secured within the opening 26a is the same as in the embodiment above described; and since the pin 32a retracts essentially to a position where it does not materially extend into the opening 26a, no interference of the key ring, as being caught in the arcuate cut-out 50a, is likely. However if such should occur, the holder 12b can simply be manipulated such that the key ring 18 is positioned to the far side of the opening 26a, that is, the side distal from the arcuate cut-out 50a. Such can easily be accomplished by a sequential downward and rearward motion upon the body 12b.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A key ring holder comprising a longitudinally oriented and substantially enclosed housing including a longitudinally extending body having intermediate sidewalls and terminating at opposite ends in a rear end and a front end wherein said front end terminates in a front edge face, are opening only for receipt of a key ring proximal to said front edge face extending through said body thickness, a passage longitudinally oriented within said body, said passage opening at said front edge face and extending between said front end and said opening such that said key ring is both solely received and removed from said opening through said passage, a longitudinally oriented post supported by said housing and longitudinally slidably movable between a first closed position wherein said passage is obstructed to block the removal or receipt of said key ring therein and a second open position wherein said passage is substantially unobstructed to freely permit the removal or receipt of said key ring therein, said post terminating in a forward face which is flush with said front edge face in said first position, said post including actuation means to retract said post to said second open position, and means for normally biasing said post to said first position.

2. The holder of claim 1, said passage being laterally offset with respect to said opening.

3. The holder of claim 1, said opening being substantially circular, said passage being substantially straight and being laterally offset relative to the center of said opening.

4. The holder of claim 1, said member having an arcuate notch therein which is substantially aligned with and forms a part of said opening in said first position thereof.

5. The holder of claim 1, said notch and said opening cooperating to define a substantially circular opening in said housing when said member is in said first position.

6. The holder of claim 1, said actuation means including a button outwardly extending from the one sidewall of said body and longitudinally movable with respect thereto in a longitudinal slot provided therein.

7. The holder of claim 1, said front edge face being substantially flat, said post having a substantially flat front end which is substantially flush with said front edge face when said post is in said first position.

* * * * *